(12) United States Patent
Vaughn et al.

(10) Patent No.: US 8,805,883 B1
(45) Date of Patent: Aug. 12, 2014

(54) SYSTEMS AND METHODS FOR PUBLISHING PROFILED CONTENT

(75) Inventors: Thomas Andrew Vaughn, Boerne, TX (US); Ajay Tejwani, San Antonio, TX (US); Jeremy Keith Whitley, San Antonio, TX (US); Matthew George Westerman, San Antonio, TX (US); Todd O'Neill, San Antonio, TX (US); Brady Carl Stephenson, Helotes, TX (US); Randal Lane Schnedler, San Antonio, TX (US); Gopinath Khandavalli, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1293 days.

(21) Appl. No.: 11/506,715

(22) Filed: Aug. 18, 2006

(51) Int. Cl.
*G06F 7/00* (2006.01)
*G06F 17/30* (2006.01)

(52) U.S. Cl.
USPC ........................................... 707/784

(58) Field of Classification Search
CPC ................................. G06F 17/30867
USPC .......... 707/1, 2, 9, 100, 104.1, 705, 736, 757, 707/781, 783, 784
See application file for complete search history.

(56) References Cited

U.S. PATENT DOCUMENTS

| | | | |
|---|---|---|---|
| 6,697,825 B1 * | 2/2004 | Underwood et al. | 715/207 |
| 6,738,950 B1 * | 5/2004 | Barnett | 715/205 |
| 6,968,348 B1 * | 11/2005 | Carone et al. | 707/203 |
| 7,107,285 B2 * | 9/2006 | von Kaenel et al. | 707/104.1 |
| 7,475,346 B1 * | 1/2009 | Bullock et al. | 715/760 |
| 2001/0049624 A1 * | 12/2001 | Uyama et al. | 705/14 |
| 2002/0026368 A1 * | 2/2002 | Carter, III | 705/20 |
| 2002/0138331 A1 * | 9/2002 | Hosea et al. | 705/10 |
| 2005/0149859 A1 * | 7/2005 | Clark | 715/513 |
| 2007/0027829 A1 * | 2/2007 | Graf | 707/1 |
| 2007/0226064 A1 * | 9/2007 | Yu et al. | 705/20 |

OTHER PUBLICATIONS

Balasubramanian et al., "Document Management and Web Technologies: Alice Marries the Mad Hatter," *Communications of the ACM*, Jul. 1998, 41(7), 107-115.
Challenger, J. et al., "A publishing system for efficiently creating dynamic Web content," *INFOCOM2000, Nineteenth annual Joint Conference of the IEEE Computer and Communications Societies*, 2000, 2, 844-853.
Interactivetools.com, Software for your website, "Featured Products," http://www.interactivetools.com/, downloaded Aug. 10, 2006, 2 pages.

(Continued)

*Primary Examiner* — Marc Somers
(74) *Attorney, Agent, or Firm* — Fish & Richardson P.C.

(57) ABSTRACT

Systems and methods are provided for publishing profiled content, where such profiled content can be personalized to individual members. Policies for displaying such content can be set by business personnel obviating the need to hard-code such policies by information technology personnel. These polices may stipulate that personalized content covering geographic information, products owned, products available, etc., may be arranged in various ways and at various times to enhance a member's experience with such content. Personalization may be initiated by member login information, where such login information allows for the matching up of a member's profile against stored data corresponding to such a profile. Once this matching up is accomplished, member personalized content can be displayed across various web pages.

18 Claims, 12 Drawing Sheets

(56) References Cited

OTHER PUBLICATIONS

Saurus, "Saurus CMS 4 Overview," http://www.saurus.info/products, downloaded Aug. 10, 2006, 2 pages.

Springer; SpringerLink Home—Main, "Accelerating the World of Research," http://springerlink.com/(uuogpr451403bpi2u3ditnej/app/home/main.asp?referrer=default, downloaded Aug. 10, 2006, 1 page.

VertMarkets, Inc., "Industry Search," *ECM Connection*, http://www.ecmconnection.com/IndustrySearch/SearchResults.aspx?keyword=content+management&Tab Index=0 &VNETCOOKIE=NO, Aug. 10, 2006, 2 pp.

VertMarkets, Inc.; EMC Documentum ApplicationXtender, "EMC Documentum Application Xtender: Product Showcase/Product Sheet," *EMC Connection*, http://www.ecmconnection.com/content/productshowcase/product.asp?docid=680413fc-d340-414b-9375, downloaded Aug. 10, 2006, 4 pages.

VertMarkets, Inc.; FileNet Content Manager, "FileNet Content Manager: Product Showcase/Brochure," *ECM Connection*, http://www.ecmconnection.com/content/productshowcase/product.asp?docid=da2fb309-2a5c-492f-9735, downloaded Aug. 10, 2006, 8 pages.

VertMarkets, Inc.; Interwoven Content Management, "Interwoven: Product Showcase," http://www.ecmconnection.com/content/productshowcase/product.asp?docid=21a6bdd8-dcf3-408a-9073, downloaded Aug. 10, 2006, 2 pages.

VertMarkets, Inc.; Stellent Universal Content Management, "Stellent Universal Content Management: Product Showcase/Product Brochure," *ECM Connection*, http://ecmconnection.com/content/productshowcase/product.asp?docid=ce5460b4-1770-4d2b-8eae, downloaded Aug. 10, 2006, 7 pages.

VertMarkets, Inc.; Vignette Content Management, "Vignette Content Management: Product Showcase/Product Brochure," *ECM Connection*, http://www.ecmconnection.com/content/productshowcase/product.asp?docid=2ab98072-532d-4202-8ed4, downloaded Aug. 10, 2006, 6 pages.

* cited by examiner

SYSTEMS AND METHODS FOR PUBLISHING PROFILED CONTENT

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, USAA.

CROSS-REFERENCE TO RELATED SUBJECT MATTER

The presently disclosed subject matter is related to the following applications: U.S. application Ser. No. 11/506,915, filed Aug. 18, 2006, entitled "Systems and Methods For Publishing Profiled Content," and U.S. application Ser. No. 11/506,637, filed Aug. 18, 2006, entitled "Systems and Methods For Publishing Profiled Content."

FIELD OF TECHNOLOGY

The present subject matter relates to the field of content publishing, and more particularly, to systems and methods for publishing profiled content, although such methods and systems correspond to merely an exemplary and non-limiting field of the presently disclosed subject matter.

BACKGROUND

There are various content publishing tools. Most of these tools publish generalized content to an audience, where such content is not personalized to specific individuals within that audience. Of the publishing tools that provide some degree of personalization, such personalization is accomplished by having developers or information technology personnel hard-code personalized content. In other words, such individuals have to access source files, whether XML files, C++ or C# files, etc., and manually change code to effect a personalized publication. Thus, to address such shortcomings, and other such related shortcomings, various systems and methods are disclosed herein for the publishing of profiled content by any personnel without having to hard-code any personalized content.

SUMMARY

Systems and methods are provided for publishing profiled content. Such profiled content can be personalized to individual members of a company or an enterprise. Moreover, policies for displaying such content can be set by business personnel who need not hard-code such policies. These polices may stipulate that personalized content covering geographic information, products owned, products available, etc., may be arranged in various ways and at various times to enhance a member's experience with such content.

In one non-limiting aspect of the present disclosure, an interface is presented to policy setters that can use specific content, metadata, and taxonomy information to provide personalized web pages. Such personalization may be initiated by member login information, where such login information allows for the matching up of a member's profile against stored data corresponding to such a profile. Once this matching up is accomplished, member personalized content can be displayed across the mentioned web pages.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Certain specific details are set forth in this description and accompanying figures to provide a thorough understanding of various aspects of the presently disclosed subject matter. However, certain well-known details often associated with computing and software technology are not set forth in this disclosure in order to avoid unnecessarily obscuring these various aspects. Further, those of ordinary skill in the relevant art will understand that they can practice other aspects of the presently disclosed subject matter without one or more of the details described below. Finally, while various methods are described with reference to steps and sequences in this description, the description as such is for providing a clear implementation of the aforementioned aspects, and the steps and sequences of steps should not be taken as required to practice this subject matter.

Aspects of Systems and Methods for Publishing Profiled Content

Figure 1:
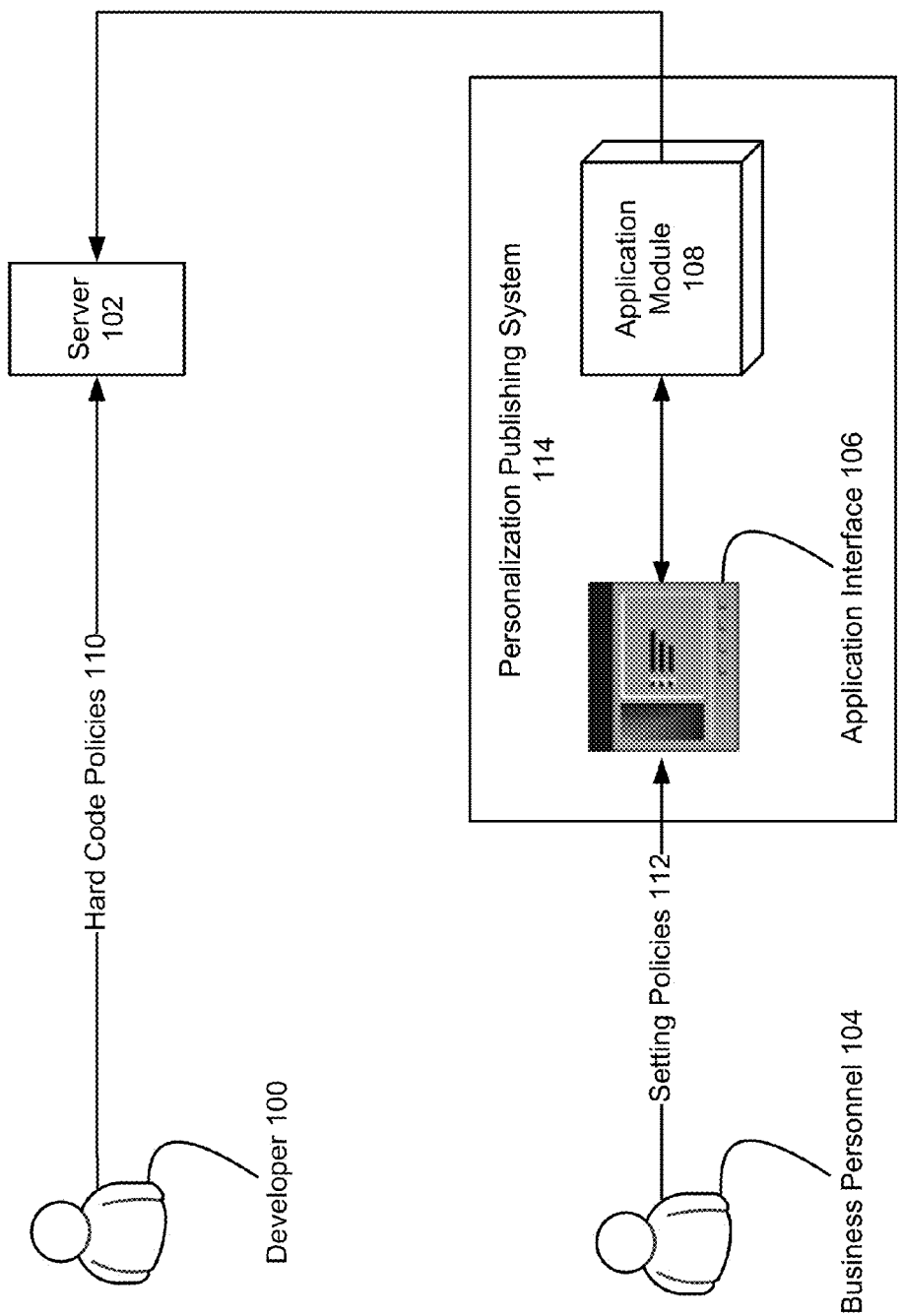
FIG. 1 illustrates a personalization publishing system that allows any personnel, such as business personnel, to set publishing policies without having to hard-code such policies.

In one aspect of the presently disclose subject matter, FIG. 1 illustrates a personalization publishing system 114 that allows any personnel, such as business personnel 104, to set publishing policies without having to hard-code 110 such policies. Per FIG. 1, generally speaking, there are two ways to personalize content that may eventually be published: (1) hard-coding 110 such content, and (2) setting such content 112 via various interfaces 106. It is well understood in the art, that the concept of "content" herein has a broad meaning, not being limited to web pages, text messages, etc., but instead encompassing any information capable of being displayed or conveyed by any computing device (the discussion with reference to FIG. 9 contains an exemplary listing of computing devices, and the discussion with reference to FIG. 10 contains an exemplary networking environment for the communication of such devices). In the first case, a developer 100 may directly hard-code policies 110 into a server 102. For example, if such a server is an application server or a web server that contains rules for publishing web pages, such a developer 100 may set these rules by accessing source file governing the publishing of such web pages. This approach is very time consuming, and is prone to many errors, since changing the code in one file may have adverse and unintended consequences for other published content.

Alternatively, in the second case, business personnel 104 can effect the same policy changes as the developer 100, but without having to access the aforementioned source files. The business personnel 104 can set policies 112 using an interface 106. This interface 106 can communicate such policies to an application module 108, and this application module 108 can automatically implement these policies (several of such implementations are discussed in more detail below). This setup allows for any one, whether trained in computer science or not, to set publishing polices for content. Once these policies are set, the server 102 can publish content according to these policies. These policies can be set for a particular member, or the same policies can be set for a set of members, if such members have any association with the other—whether personal (family) or not (military rank). Thus, polices may be personalized on an individual basis, or a group basis via categories such as age, rank, city, etc.

It should also be noted that the interface can be distributed for various administrators that want to set policies. Various protocols can be employed to allow for different levels of policy setting authority—and which policies from different administrators should be implemented. Thus, a conflict resolution module can be used so that the appropriate polices are applied to members.

Figure 2:
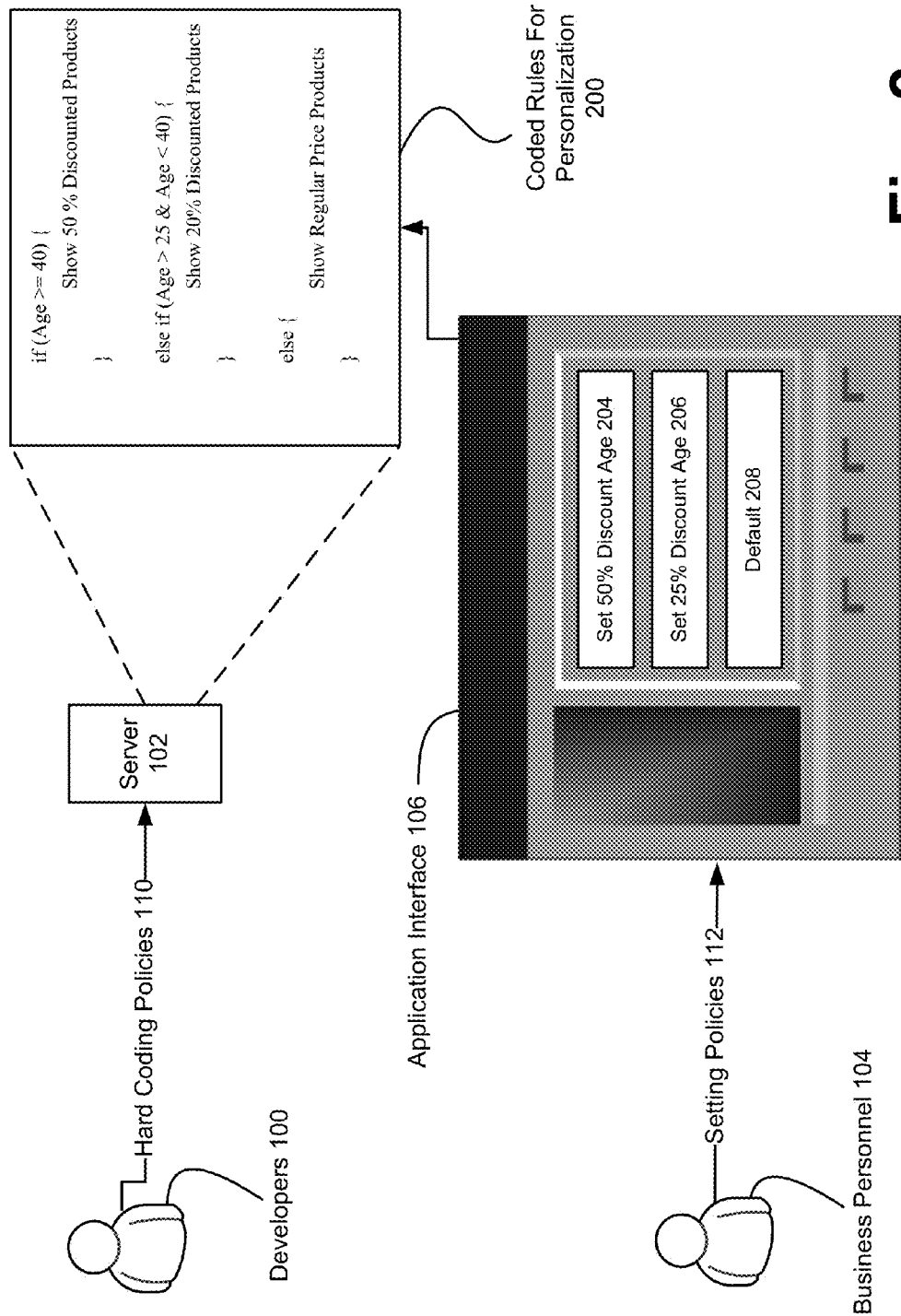
FIG. 2 provides an exemplary scenario of the subject matter discussed with reference to FIG. 1, discussing the hard-code and interface approaches in more detail.

FIG. 2 provides an exemplary scenario of the subject matter discussed with reference to FIG. 1, discussing the hard-coded and interface approaches in more detail. In the hard-coded approach, developers 100 hard-code policies 110 into a server 102. What this means, by way of example and not limitation, is that such developers may need to access source files containing coded rules for the personalization of content 200. FIG. 2 shows that one such rule is that if a person for whom content is personalized is forty years or older, products are shown that have been discounted 50%. Otherwise, for persons that are older than twenty-five but younger than forty, products are shown that have been discounted 25%. Lastly, for any other persons, namely, those younger than twenty-five, regularly priced products are shown. These exemplary rules typically have to be hard-coded by developers 100. In other words, developers may have to take marketing decisions and translate them into code. This approach is prone to error since developers may mistakenly implement such decisions (i.e. they may make logical errors), given the complexity of code, or may not implement them in the desired manner for publishing purposes given the complexity of file structures (results of such decisions may show up on some, but not all web pages)—for example, implementing such changes in one file, but not in another file that may contain various dependencies on the former file.

In contrast to this approach, any business personnel 104 can set the same policies 112 as the developers 100, using an easy-to-use application interface 106. This interface 106 may contain fields for the aforementioned setting of 50% discounts 204, 25% discounts 206, or default 208 pricing. Thus, business personnel 104 can set the age of individuals who will receive the 50% discount—whether that age is forty, as in the above example, or some other age (the same holds true for any other discounts 206 or default settings 208). This approach saves considerable time in translating business decisions to the publishing of content for specific individuals. Now, merely changing one field, such as the 50% discount field 204, can have global effects on the coded rules 200, thereby saving not only time but also debugging time in case there are any errors in the logic or semantics of the coded rules 200.

Figure 3:
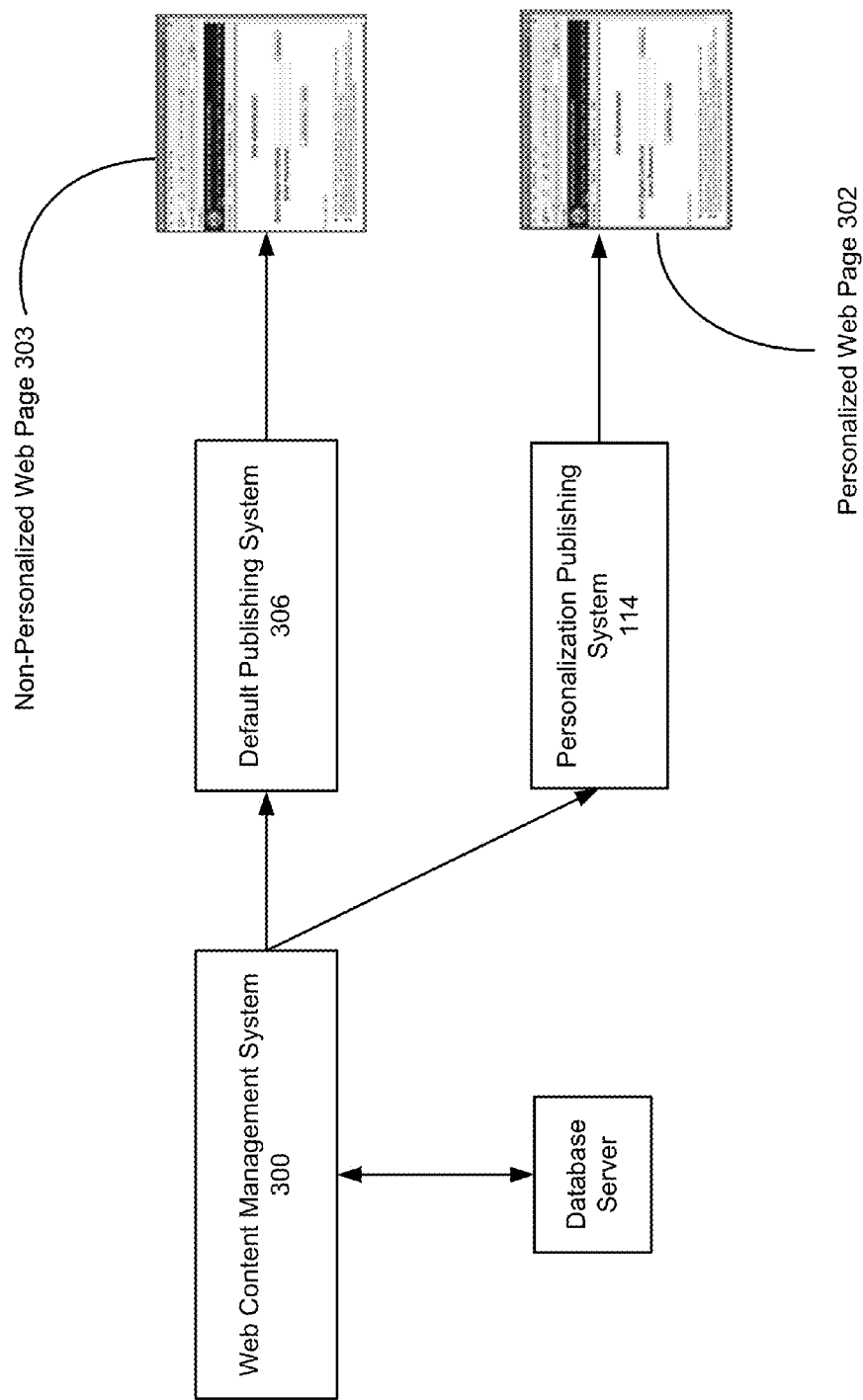
FIG. 3 illustrates that the personalization publishing system discussed with reference to FIG. 1 and explained in FIG. 2, can interface with any web content management system.

Next, FIG. 3. illustrates that the personalization publishing system 114 discussed with reference to FIG. 1 and explained in FIG. 2, can interface with any web content management system 300. Such a management system 300 can be, for example, any software that enables the creation, review, and publication of web content. Typically, such a management system 300 will have its own default publishing system 306 that will publish uniform, non-personalized content 303 to its entire audience. The personalization publishing system 114 can interface with such a management system 300 to publish personalized content. By accessing various database, web, and application servers (as will be shown with reference to FIG. 5C), such a personalization publishing system 114 will publish content that would otherwise not be personalized 302 to users accessing, for example, web pages 302.

It should be noted, however, that such a personalization publishing system 114 does not have to interface with a web content management system 300, since it could incorporate the creation, reviewing, etc. capabilities of the management system 300 and act instead as a stand alone publishing tool. The interfacing aspect of the personalization publishing system 114, thus, is merely exemplary and non-limiting.

Figure 4:
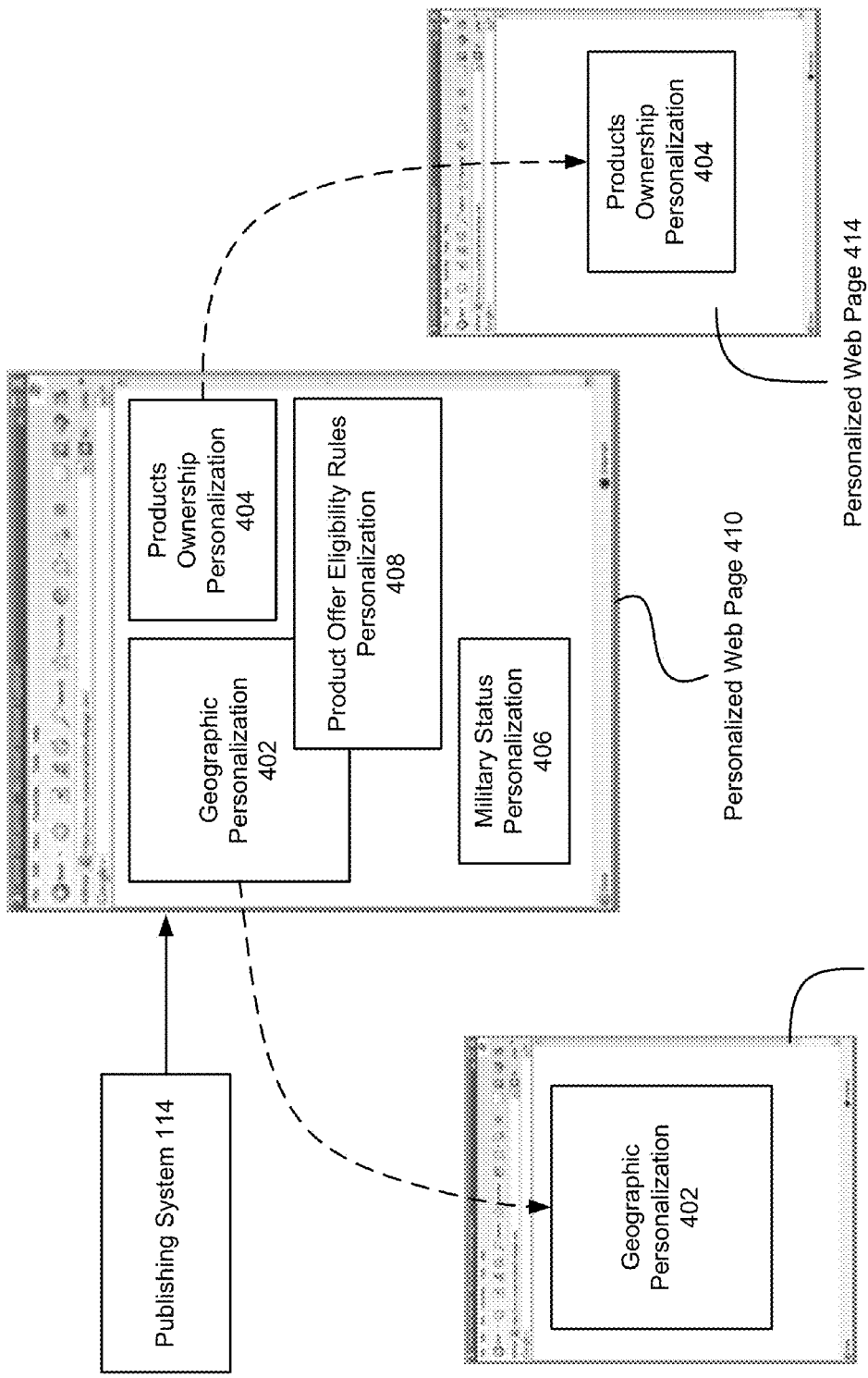
FIG. 4 illustrates various aspects of the personalization of content that can be accomplished with using the personalization publishing system.

FIG. 4 illustrates various aspects of the personalization of content that can be accomplished with using the personalization publishing system. The publishing system 114 publishes personalized web pages 410, 412, 414 that have various personalization components. For example, one web page 410 can have content that is personalized to an individual based on that individual's geographic information 402, the products owned 404 by that individual, the products that the individual is eligible for 408, the military status of the individual 406, and so on. Those of skill in the art will readily recognize various other personalization components, since these mentioned components 402, 404, 406, 408 are not limiting to the presently disclosed subject matter, but are rather merely exemplary.

These personalization components 402, 404, 406, 408 can be used not only in specific web pages 410, but can be reused in other web pages 412, 414. Thus, for example, the geographic personalization component 402 can be used on one personalized web page 410 and it can also be used on another web page 412 (similar logic holds true for the products owned component 404 that appears on two different web pages 410, 414). Furthermore, these components 402, 404, 406, 408 can be arranged on web pages in various ways, whether they overlap or not, or whether they dynamically and/or automatically change or not.

For example, these data components can be dynamically updatable if profile information of a member is subject to some change—whether an address change, military rank, etc. In fact, the dynamism of the presently disclosed subject matter extends to implementing data component changes during the time the member is logged on to the system hosting the personalized web page 410. Changes to data components can occur for a variety of reasons: for instance, additional information can be provided by some enterprise information mechanism, or, alternative, it can be provided by third party sources.

Figure 5A:
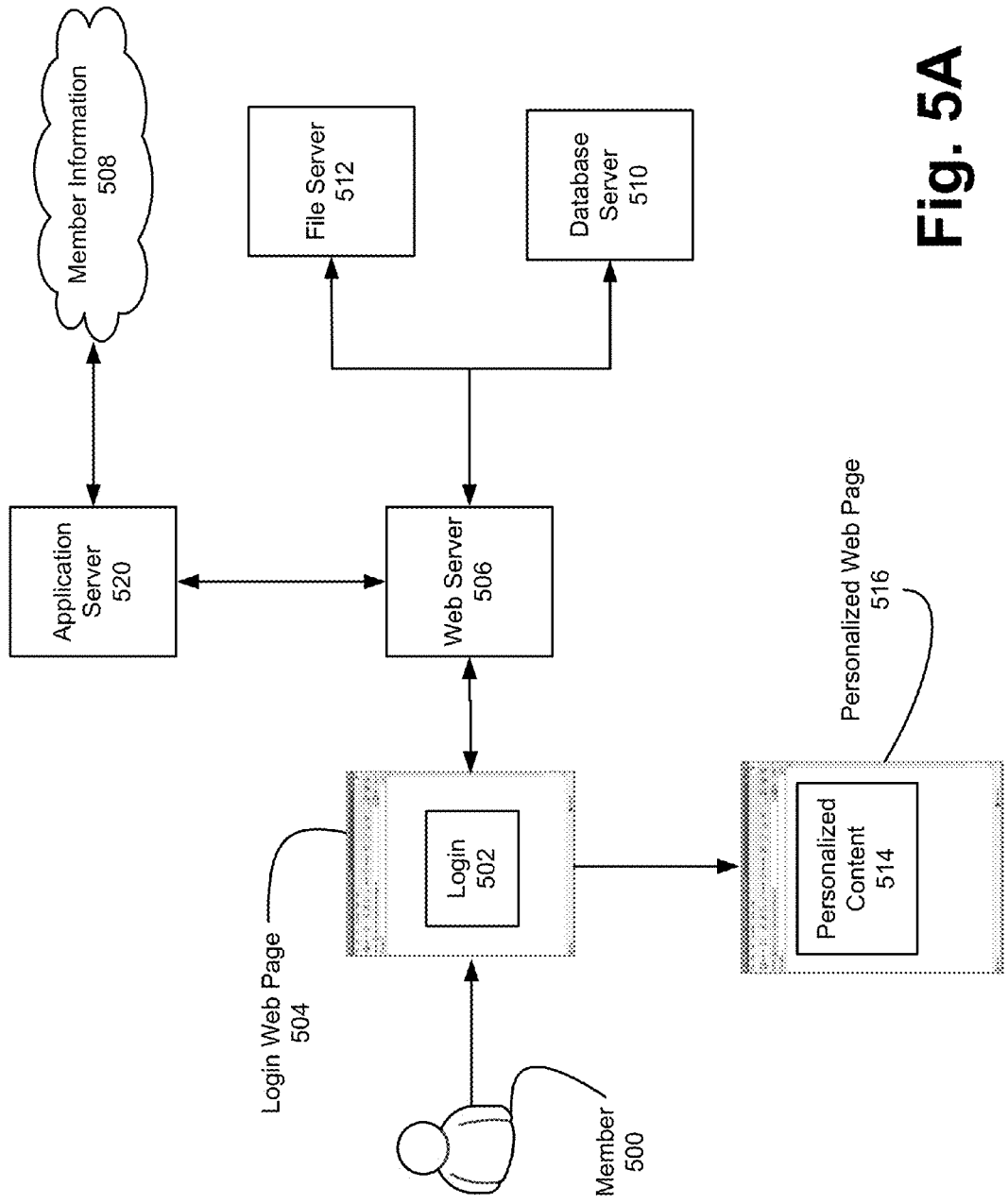
FIG. 5A illustrates one possible implementation for a personalization mechanism either as a system, method, computer readable media, or any other such mechanism.

Next, FIG. 5A illustrates one possible implementation for a personalization mechanism either as a system, method, computer readable media, or any other such mechanism. In FIG. 5A, a member 500 (which may be, for example, any individual accessing an enterprise or company web site that has access to such a web site) accesses a secure web page 504 and provides login information 502. Such login information 502 can invoke the member's 500 profile information 508. The profile information can have various attributes, from the home address of the member 500, to the products owned by that member 500, to the age and military status of the member 500, and so on.

The member profile information 508, which may be accessed by a web server via an application server 520 (or any appropriate server for a specified architecture), and such profile information 508 may then be matched up against data and metadata stored on file servers 512 and database servers 510, respectively. For example, if the member's 500 profile information 508 states that the member is forty years of age, then this information can be matched up against any data applicable to members who are forty years of age—as was discussed above in an example, those of forty years or more were given a 50% discount.

Once the appropriate data is matched up against the member's 500 profile information 508, a personalized web page 516 containing personalized content 514 can then be shown to the member 500. As was already discussed with reference to FIG. 4, personalized web pages 516 may take on various layouts and provide various personalization components that may be specified by the aforementioned business personnel 104 of FIG. 1.

Figure 5B:
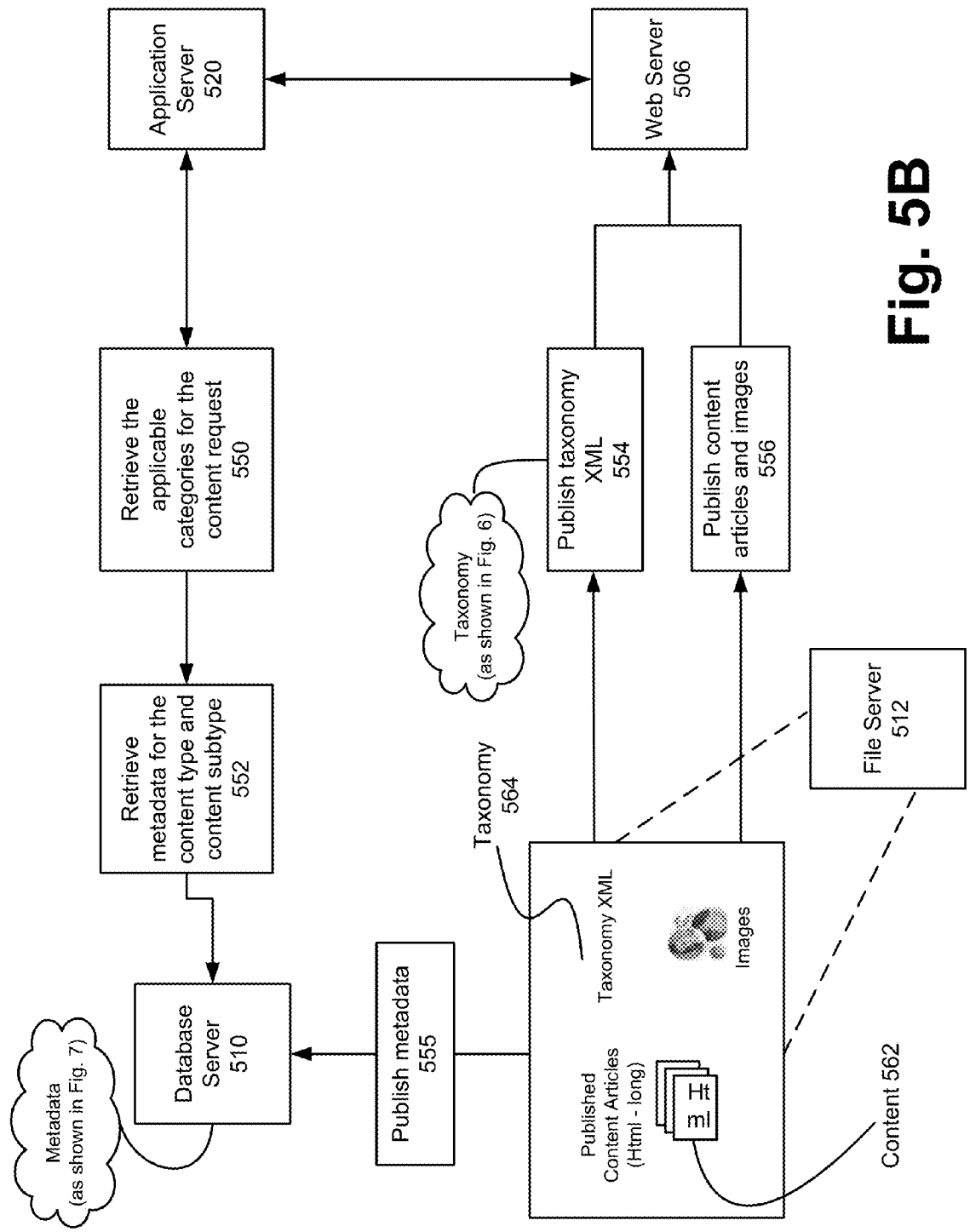
FIG. 5B illustrates one exemplary implementation of the subject matter discussed with reference to FIG. 5A, showing how metadata, taxonomy information, and content is obtained and used to construct personalized content.

FIG. 5B illustrates one exemplary implementation of the subject matter discussed with reference to FIG. 5A, showing how metadata, taxonomy information, and content is obtained and used to construct personalized content. In FIG. 5B, a web server 506 retrieves and loads various files and information in order to construct personalized content, such as a personalized web page. The web server 506 may first retrieve the applicable categories 550, via an application server 520, for content requested by members (members who login). This means that metadata is retrieved for the content type and content subtype 552 that is requested. An example of metadata information is given in FIG. 7. A database server 510 can provide such metadata, which is used in conjunction with taxonomy 564 and actual content 562 to construct a personalized web page. In one aspect of the presently disclosed subject matter, contents of a file server 512, such as metadata, can be published 555 to the database server 510, so that this server can accomplish the aforementioned retrieval tasks.

Figure 6:
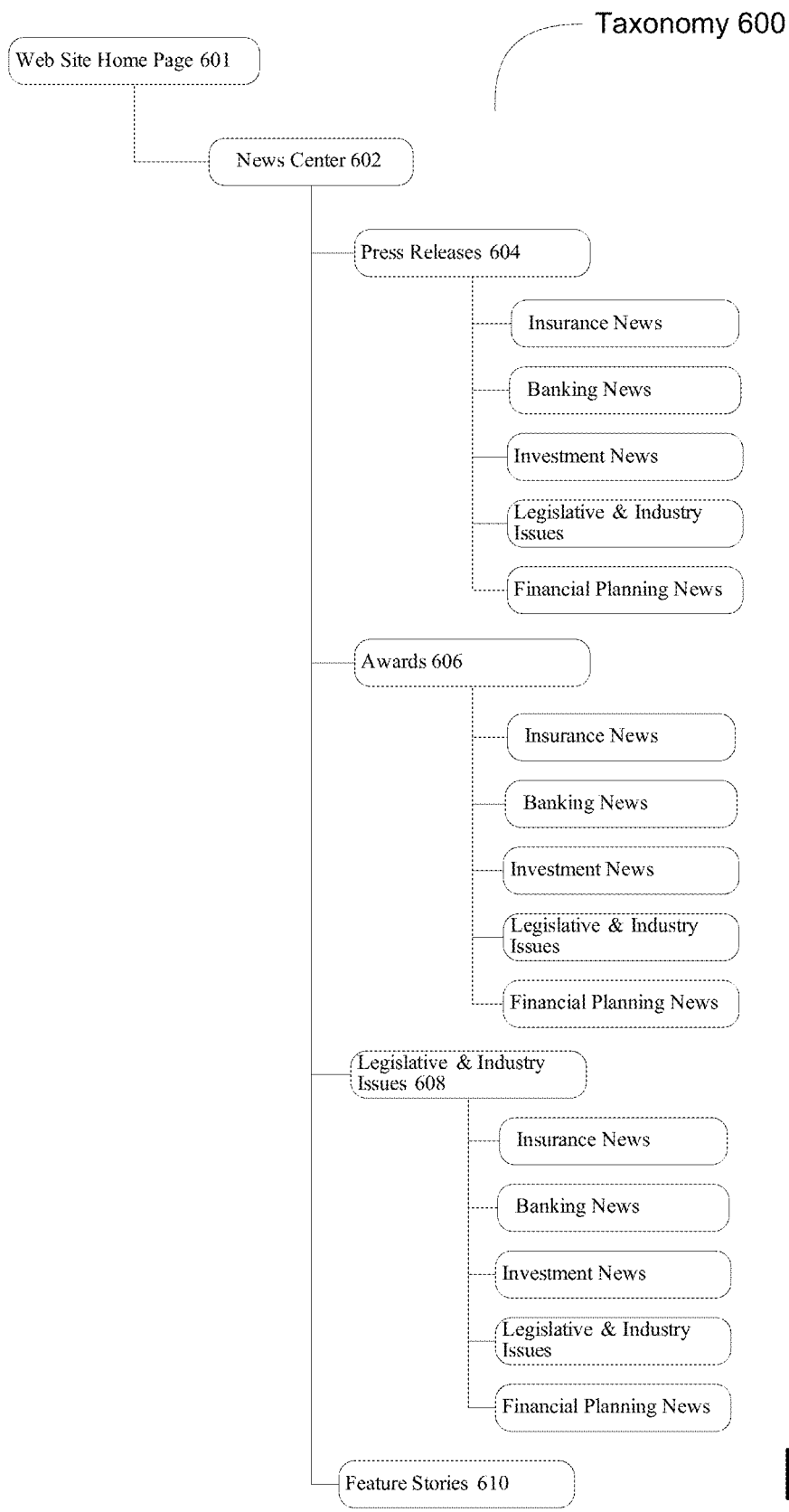
FIG. 6 illustrates by way of example and not limitation sample taxonomy information.

A taxonomy file is also loaded or published 554 and the actual content is retrieved or published 556, where the actual content 562 may comprise of published articles, images, and so on (an example of taxonomy information 564 is given in FIG. 6). Once metadata, taxonomy, and content is obtained and constructed, a personalized web page, a la FIG. 4, can be published to a member.

Figure 5C:
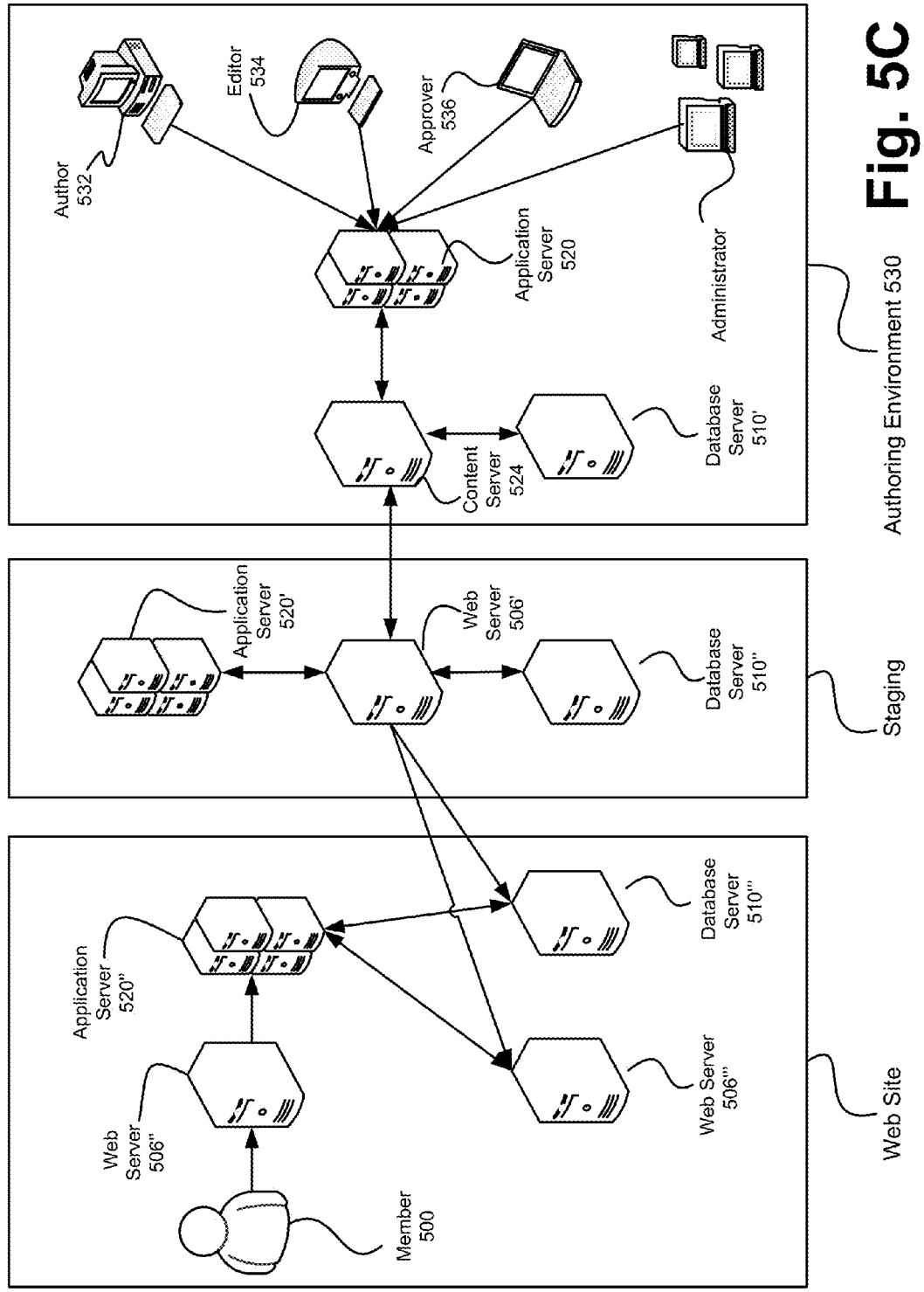
FIG. 5C illustrates one exemplary and non-limiting server architecture that can be used by the publishing system discussed herein.

It should be noted that various architectures can be used to accomplish this task. For example, FIG. 5C illustrates one exemplary and non-limiting server architecture that can be used by the publishing system discussed herein. In going from right to left in FIG. 5C, content is first authored 532, then edited 534, then approved 536, and finally uploaded to an application server by an administrator 538. This application server 520 can then communicate with a content server 524, responsible for managing content. This content server 524, in turn, can be communicatively coupled to various other servers, such as database servers 510' and web servers 506'. All these servers may operate in an authoring environment 530, since this is the environment for the actual construction of content that will eventually be published.

The content server 524 can relay content to a web server 506', which in turn may be communicatively coupled to various application servers 520' and database servers 510". This web server 506' corresponds to a staging point in the publishing process, since this is where content is prepared for publication. Once the web server 506' has all the appropriate content to be published, it can relay this content to a web server 506''' and a database server 510'''. For example, this former web server 506' can relay actual content (articles, images, etc.) and taxonomy information to the latter web server 506''', and metadata to a database server 510'''. This content is then retrieved by an application server 520''. Once a member 500 is logged in, the third web server 506'' can access the content stored in the application server 520'' to publish it. This content, of course, can be personalized content that corresponds to the member's 500 login information.

By way of example and not limitation, FIG. 6 illustrates sample taxonomy information 600. For instance, a web site home page 601 may have news center 602 content that is distinctly arranged from other kinds of content (product content, help content, etc.). The news center 602 content may in turn be hierarchically arranged into press release information 604, awards 606, legislative and industry issues 608, and feature stories 610. Each of these pieces of information, may in turn be further arranged. For instance, press release information 604 is subdivided into insurance news, banking news, investment news, legislative and industry issues, financial planning news, and so on. The taxonomy 600 shows show content may be arranged, as it is personalized for various users—that is, taxonomy may provide a framework of arrangement for web pages, as each of these web pages has personalized content for each member accessing the web site.

Figure 7:
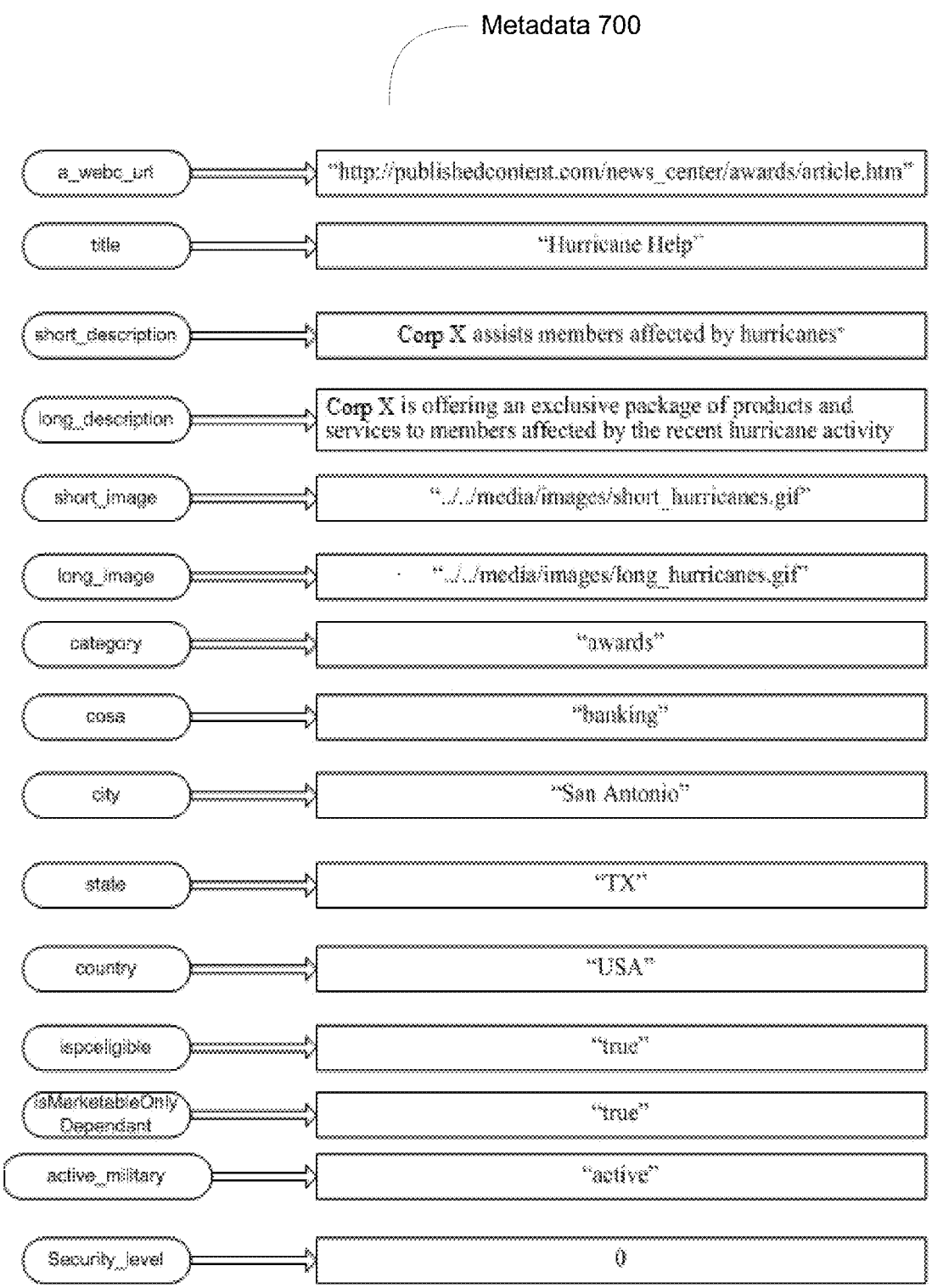
FIG. 7 also shows by way of example and not limitation how the aforementioned metadata may be arranged.

FIG. 7 also shows by way of example and not limitation how the aforementioned metadata may be arranged. The illustrated metadata 700 has a specific URL (the top most box), title information (second box from top), security level information (bottom most box), and so on. It will be appreciated that various metadata schema can be used, and this is merely exemplary metadata, shown herein to give more context to the discussion regarding metadata and actual content (and taxonomy) provided with reference to FIG. 5B.

Figure 8:
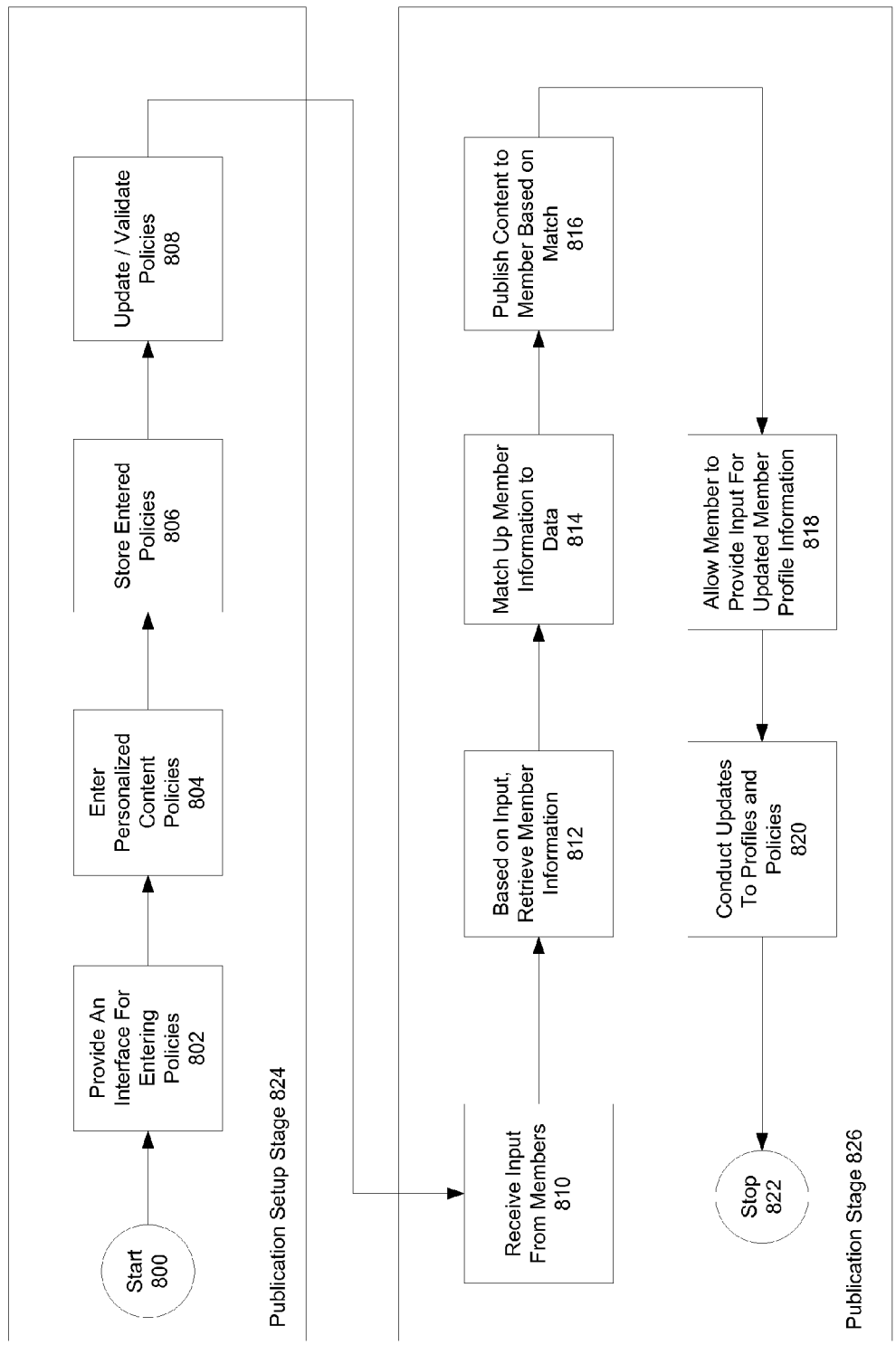
FIG. 8 shows in block diagram form a flow chart summarizing some of the various aspects of the presently disclosed subject matter that could be practiced as a method, subsisted on various computer readable media, or implemented in a publishing system.

Finally, FIG. 8 shows in block diagram form a flow chart summarizing some of the various aspects of the presently disclosed subject matter that could be practiced as a method, subsisted on various computer readable media, or implemented in a publishing system. At block 800, the method is started (if the method is embodied as computer readable instructions, for example, this would be tantamount to running a program composed of the instructions, with object instantiations, and so on). Next, at block 802, an interface is provided to administrators or business personnel (or even developers), so that these individuals can enter publishing policies for any associated content. As was already mentioned, such polices may dictate what personalized content will be shown to members using this infrastructure.

Once the interface is provided, at block 804, users of the interface can set various policies that were previously hard-coded. At block 806, these policies are entered into some kind of database, so that they can be applied to publishable data. Furthermore, at block 808, various policies that have been already set, can be updated and/or validated. After this point, the publication setup stage 824 is completed, and content is ready for display to users.

Next, at block 810, a web page or some other kind of interface, whether cell-phone based, or personal digital assistant based, is configured to receive input from members of the infrastructure. At block 812, based on member input, namely, login information, member profile information is retrieved. This member profile information can also be updated or validated by any administrators (or alternatively, as is explained below, it may be updated by the users themselves). Once login information is provided, at block 814, member profile information is matched up against the appropriate data—i.e. the appropriate data is retrieved that corresponds to specific member categories. Then, at block 816, personalized content is published to members. In one aspect of the presently disclosed subject matter, such personalized content may be embodied in a web page.

At block 818, members may also have the opportunity to update their profile to obtain the appropriate content. However, some safety measures may also be place, such as not allowing member to randomly change their profile from, say, being a sergeant to a general if such a change is unwarranted. In other aspects, this member input mechanism may be altogether omitted. Lastly, at block 820, any other updates can be conducted to profiles and policies by administrators themselves. This block 820, it should be noted, may be implemented at various intervals of either the publication setup stage 824 or the publication stage 826. Finally, the publication stage 822 is ended when a user decides to logout or is a session has expired.

Figure 9:
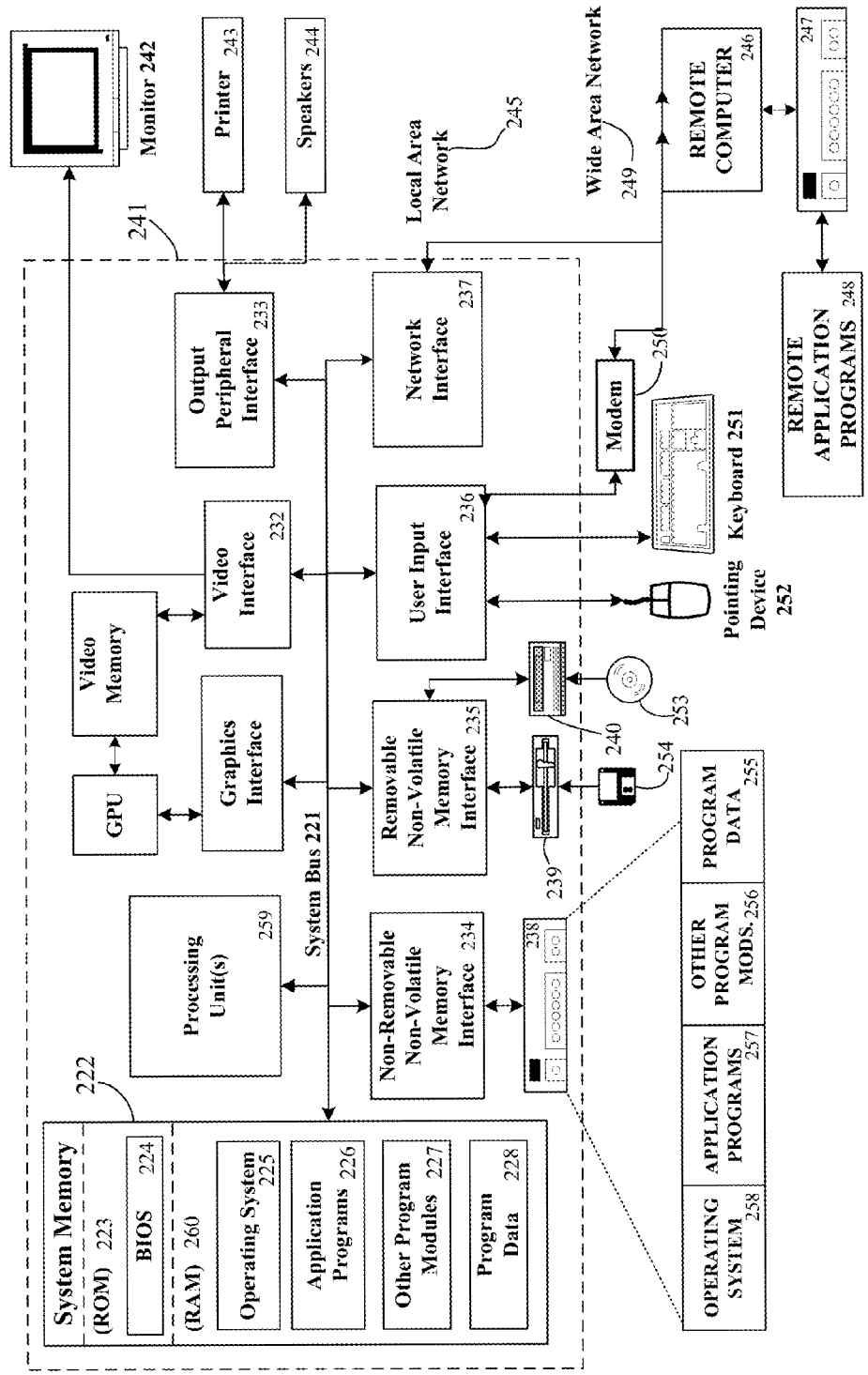
FIG. 9 illustrates a block diagram representing an exemplary computing device environment suitable for use in conjunction with the presently disclosed methods and systems.

Exemplary Computing and Networking Environments for Systems and Methods for Publishing Profiled Content Now Referring to FIG. 9, shown is a block diagram representing an exemplary computing device suitable for use in conjunction with implementing the systems and methods described above. For example, the computer executable instructions that carry out the processes and methods for publishing profiled content may reside and/or be executed in such a computing environment as shown in FIG. 9. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 9 illustrates operating system 225, application programs 226, other program modules 227, and program data 228.

The computer 241 may also include other removable/non-removable, volatile/nonvolatile computer storage media. By way of example only, FIG. 9 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 9, provide storage of computer readable instructions, data structures, program modules and other data for the computer 241. In FIG. 9, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 9. The logical connections depicted in FIG. 9 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 9 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and nonvolatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 9, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 10:
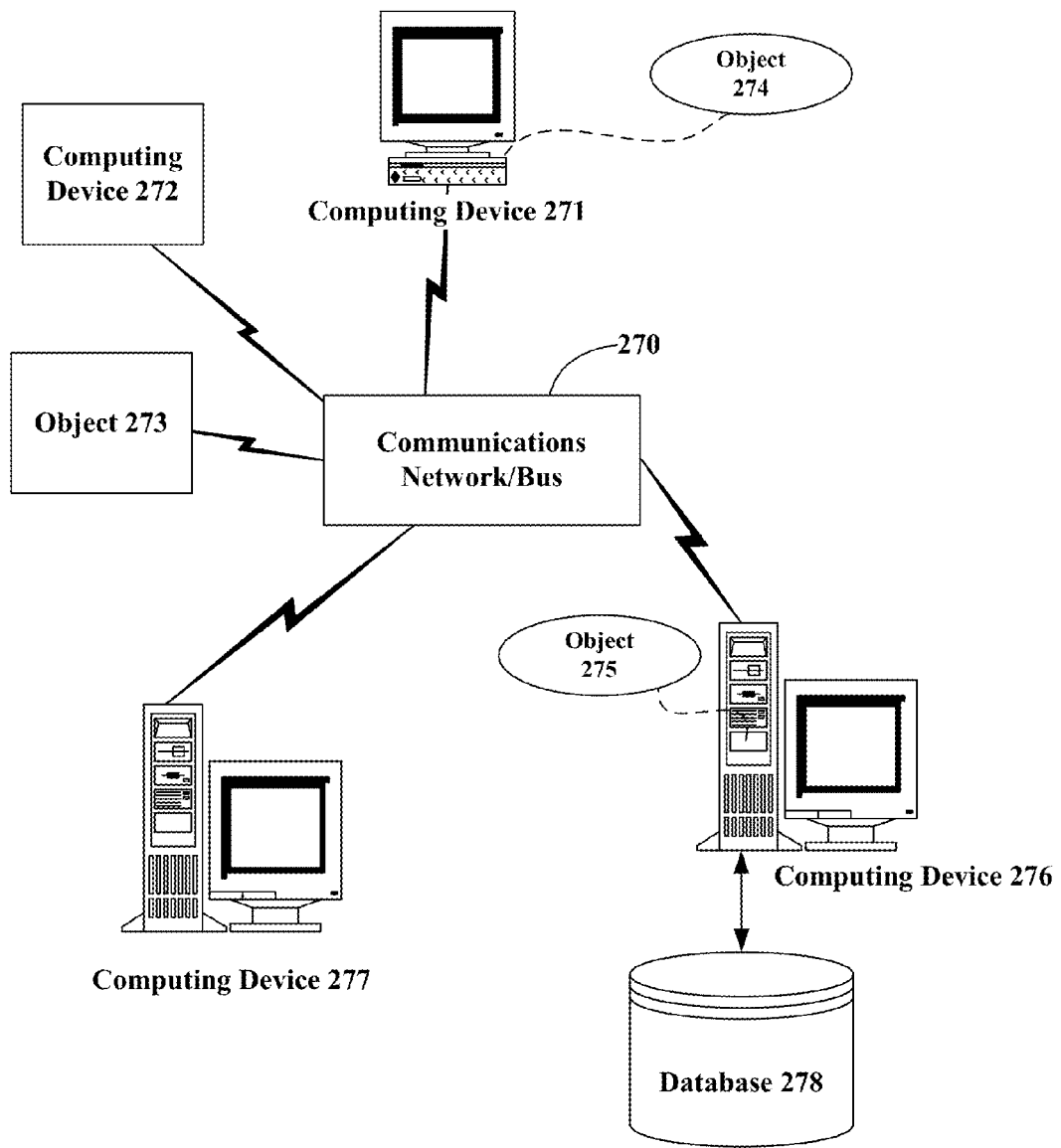
FIG. 10 illustrates an exemplary networked computing environment in which many computerized processes may be implemented to perform the aforementioned methods and systems.

Referring next to FIG. 10, shown is an exemplary networked computing environment in which many computerized processes may be implemented to perform the processes described above. For example, parallel computing may be part of such a networked environment with various clients on the network of FIG. 10 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 10 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 10, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 10, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 10 and the further diversification that can occur in computing in a network environment such as that of FIG. 10, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, mechanisms for publishing profiled content were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for publishing personalized content, comprising:
 a processor; and
 a memory, having executable instructions stored therein to:
  retrieve predefined profile information from a database for a member in response to the member being authenticated to the system;
  receive a request for a requested content from the member;
  retrieve content data from the database based on said profile information and the requested content, wherein:
   said content data is personalized for said member by a web server based on a set of policies and metadata that is retrieved for the requested content;
   the metadata is used in conjunction with taxonomy information and the content data to construct a personalized web page that is published to an interface; and
   the set of policies are resolved for said member based on a number of policies set by a number of other members from a group of associated members;
  dynamically update the content data in response to a change in the predefined profile information for the member; and
  receive a request, through an interface, from a business personnel and not a developer or administrator to update the set of policies that define rules for personalizing the content data for the member and the number of other members from the group of associated members.

2. The system according to claim 1, wherein said set of policies are based on categories of data.

3. The system according to claim 1, wherein said interface is a web browser.

4. The system according to claim 1, further comprising instructions to retrieve said content data from a content database and a metadata database.

5. The system according to claim 1, further comprising instructions to update said profile information.

6. The system according to claim 1, wherein components of said content data are reused across a plurality of web pages.

7. A method for publishing personalized content, comprising:
 retrieving predefined profile information from a database for a member in response to the member being authenticated to a content publishing system;
 receiving a request for a requested content from the member;
 retrieving content data from the database based on said profile information and the requested content, wherein:
  said content data is personalized for said member by a web server based on a set of policies and metadata that is retrieved for the requested content;
  the metadata is used in conjunction with taxonomy information and the content data to construct a personalized web page that is published to an interface; and
  the set of policies are resolved for said member based on a number of policies set by a number of other members from a group of associated members;
 receiving a change in the predefined profile information, wherein the content data is dynamically updated in response to the change in the predefined profile information; and
 receiving a change, through an interface, to the set of policies that define rules for personalizing the content data for the member and the number of other members from the group of associated members, wherein the set of policies are changed by a business personnel and not a developer or administrator.

8. The method according to claim 7, further comprising basing said set of policies on categories of data.

9. The method according to claim 7, using said interface as a web browser.

10. The method according to claim 7, retrieving said content data from a content database and a metadata database.

11. The method according to claim 7, further comprising updating said profile information.

12. The method according to claim 7, further comprising reusing components of said content data across a plurality of web pages.

13. A computer readable medium storing tangible computer executable instructions for publishing personalized content that when executed perform the method, comprising:
 retrieving predefined profile information from a database for a member in response to the member being authenticated to a content publishing system;
 receiving a request for a requested content from the member;
 retrieving content data from the database based on said profile information and the requested content, wherein:
  said content data is personalized for said member by a web server based on a set of policies and metadata that is retrieved for the requested content;
  the metadata is used in conjunction with taxonomy information and the content data to construct a personalized web page that is published to an interface; and
  the set of policies are resolved for said member based on a number of policies set by a number of other members from a group of associated members;
 receiving a change in the predefined profile information, wherein the content data is dynamically updated in response to the change in the predefined profile information; and
 receiving a change, through an interface, to the set of policies that define rules for personalizing the content data for the member and the number of other members from the group of associated members, wherein the set of policies are changed by a business personnel and not a developer or administrator.

14. The computer readable medium according to claim 13, further comprising basing said set of policies on categories of data.

15. The computer readable medium according to claim 13, using said interface as a web browser.

16. The computer readable medium according to claim 13, retrieving said content data from a content database and a metadata database.

17. The computer readable medium according to claim 13, further comprising updating said profile information.

18. The computer readable medium according to claim 13, further comprising reusing components of said content data across a plurality of web pages.

* * * * *